United States Patent [19]

Lukens et al.

[11] Patent Number: 4,975,558

[45] Date of Patent: Dec. 4, 1990

[54] SYSTEM FOR CONTROL OF WELD ARC DEVELOPMENT

[75] Inventors: William E. Lukens, Annapolis; Robert DeNale, Arnold; Charles A. Zanis, Bowie, all of Md.

[73] Assignee: The United States of America as represented by the Secretary of the Navy, Washington, D.C.

[21] Appl. No.: 411,171

[22] Filed: Sep. 20, 1989

[51] Int. Cl.$^5$ .............................................. B23K 9/08
[52] U.S. Cl. ............................. 219/124.34; 219/123; 219/130.21
[58] Field of Search ..................... 219/130.21, 124.34, 219/123

[56] References Cited

U.S. PATENT DOCUMENTS

| | | | |
|---|---|---|---|
| 2,994,763 | 8/1961 | Schultzk | 219/123 |
| 3,551,637 | 12/1970 | Lampson | 219/123 |
| 3,627,972 | 12/1971 | Iceland et al. | 219/124 |
| 4,555,614 | 11/1985 | Morris, et al. | 219/130.01 |
| 4,594,497 | 6/1986 | Takahaski | 219/130.21 |

Primary Examiner—Clifford C. Shaw
Attorney, Agent, or Firm—Luther A. Marsh; John H. Stowe

[57] ABSTRACT

A method of welding metals wherein the size and shape of a weld pool as well as the traversing of the arc from one metal to the other is commanded magnetically by predetermined data, which data is updated by observing and characterizing isotherms in the weld pool, comparing the observed isotherms with a predetermined set of desired isotherms and then updating the command data for optimum performance.

6 Claims, 1 Drawing Sheet

SYSTEM FOR CONTROL OF WELD ARC DEVELOPMENT

BACKGROUND OF THE INVENTION

1. Field of the Invention

This invention relates to a control system and method for automatic welding and more particularly to a system and method capable of identifying the location and shape of a particular isotherm of the weld pool produced in the welding of dissimilar metals, determining the deviation of the measured isotherm shape and location from a desired shape and location respectively of said isotherm, and adaptively controlling the arc intensity and direction to reduce the deviations of the shape and location of actual weld pool isotherm patterns from desired isotherm patterns.

2. Background Information

During the welding of various dissimilar metal combinations, substantial arc deflection toward one base metal causes significant dilution of that base metal into the weld pool resulting in composition gradients, differing solidification characteristics, and incomplete fusion along the root of the weld joint. Similar poor results can result in welding of seams that are metallurgically similar but which have dissimilar geometry such as thickness, width and cross section. In hand welding, the shape and location of the pool is determined by observation of the operator and pool location and shape are compensated by manually adjusting the location of the electrode with respect to the seam being welded. Unfortunately, hand welding is a very tedious art and not generally susceptible to repetition for long periods of time. Many mechanical and electronic devices have been employed in the past to automate the welding process, these devices being generally directed to tracking the seam to be welded or the arc which emits from the electrode. Because of the various circumstances which exist at the weld interface, the arc may stray or drift.

There are many known causes of arc stray or drift. Among these are: welding of dissimilar metals; welding metals of similar metallurgical structure but varying in conduction characteristics resulting from differences in size and shape; convection currents resulting from the movement of shielding gas at the weld interface; localized magnetic effects; and, unequal grounding between the two pieces being welded, the latter being especially true at the beginning of the weld.

Various methods have been employed for sensing the location of the weld and various methods have been employed for re-directing the arc in attempts to equalize the impingement of the arc upon the metals to be welded. For example, in U.S. Pat. No. 2,994,763 to Schultz, a pair of sensors for sensing the radiation of the arc were located one on either side of the arc. Deviations were determined and the position of the arc was adjusted magnetically to follow a given path. This arrangement, however, relied on secondary information to determine the location of the weld pool. That is, if the arc intensities on both sides of the weld seam were equal, then it was presumed that the weld pool was correctly formed and in the right location. This assumption is subject to considerable error, especially in the dissimilar metals situation.

U.S. Pat. No. 3,627,972 to Iceland, et al. introduced a concept of looking at the total radiant energy emitted from the weld pool to control an overall average size of the weld pool. Iceland was premised on the theory that an undetectable temperature gradient existed in the weld pool due to thermal inertia and boiling of the weld pool and that the size of the weld pool and not its temperature changed.

Attempts have been made to control the quality of the weld by controlling the dwell time of the arc alternately on the two work pieces. In U.S. Pat. No. 3,551,637 to Lampson, spot thermal sensors were described as being deployed on either side of the weld seam and a magnetic deflection apparatus was employed for systematically deflecting the arc from one work piece to another.

More recently, systems for determining the centroid of a weld pool and readjusting the position of the center of the weld pool have emerged. U.S. Pat. No. 4,594,497 to Takahashi discloses one method of sensing of an isothermal pattern and adaptive control of the process in relation to isothermal lines which are sensed by an infrared camera. The method of Takahashi senses an isothermal pattern and finds the centroid thereof. Based on information obtained, the control system repositions the welding torch to relocate the centroid.

SUMMARY OF THE INVENTION

The present invention is a system and method for welding, wherein a weld beam or arc is electromagnetically deflected in a predetermined geometrical path. Isotherms (lines of constant temperature) are sensed and identified in the weld pool produced by the arc. The isotherms are sampled and identified corresponding to a plurality of X-Y coordinate locations. The sampled isotherm locations are compared with a predetermined data set having coordinate locations of a desired isotherm pattern. Error signals corresponding to the location difference between each coordinate location and a predetermined corresponding coordinates of a desired isotherm pattern are computed and magnetic energy responsive to the magnitude and direction of the error signals is superimposed on the weld arc in a manner tending to minimize the difference between the coordinate locations of the actual isotherm pattern and the coordinate locations of the desired isotherm pattern.

The system and method of the present invention can be used to provide the maximum flexibility in producing weld pools and in adapting these pools to weld dissimilar metals. By electromagnetically deflecting the weld arc, the deflection can be accomplished more rapidly and without the limitations which are associated with the mechanical deflection of the entire welding torch. Using electromagntic deflection, there are no moving parts. The arc can be readily deflected not only according to predetermined positional patterns but also in accordance with predetermined velocities. Thus, when dissimilar metals are being welded, the method easily lends itself to compensating for the different heating and cooling characteristics of the individual metals by controlling not only the pattern described by the arc but the rate at which the arc travels around the pattern.

Further, the method is practiced in an closed loop configuration for the purpose of collecting data relating to the effects of different weld arc travel patterns on the ability to maintain a specific isotherm pattern. Data is recorded when operating in the closed loop configuration and then used to approximate an ideal pattern for welding specific combinations of metals. These data are used to build a library of weld arc travel patterns for specific situations where these data are then used in a simplified open loop method and apparatus, wherein thermal sensing and feedback are not employed. The open loop method is used in situations where it is not practical to sense the actual isotherm patterns or where the weld is not so critical as to justify the expense of closing the loop. In an open loop situation, the weld is expected to be intermediate in quality between a weld performed with no predetermination of weld travel pattern and a weld performed with correlation between a desired isotherm pattern and actual isotherm patterns.

It is an object of the invention to provide a system and method for welding of dissimilar metals.

It is a further object of this invention to provide a system and method for welding where there is accurate control over the locations of isotherm patterns.

Yet another object of this invention is to provide a system and method of matching a predetermined isotherm pattern with an actual isotherm pattern.

Other objects, advantages and novel features of this invention will become apparent from the following detailed description of the invention when considered in conjunction with the accompanying drawings.

DESCRIPTION OF THE PREFERRED EMBODIMENT

Figure 1:
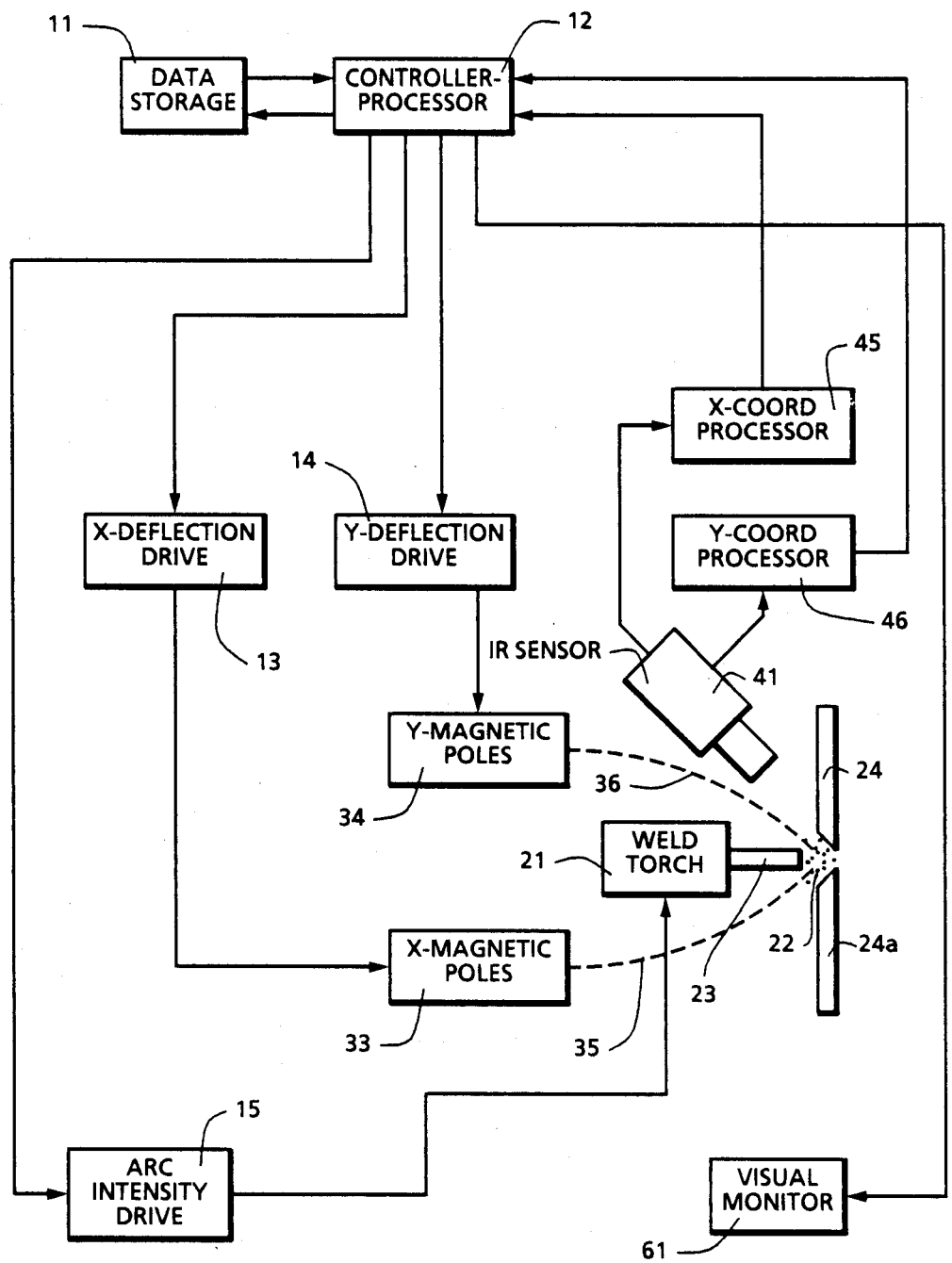
FIG. 1 is a block diagram of a weld system in accordance with the present invention.

Referring now to FIG. 1, a block diagram for an apparatus suitable for performing the present method is shown illustrated generally as 10. Data relating to a predetermined desired isotherm pattern are stored in data storage device 11. Data storage device 11 is electronic or magnetic oriented, such devices being well known in the field of data storage and retrieval. Controller-Processor 12 is in two way electronic communication with data storage device 11, controller 11 being adapted for receiving data from storage device 11; transmitting data to storage device 11; and causing data storage device 11 to store data. Controller 12 is in electronic communication with X-Deflection Drive 13; Y-deflection drive 14; and arc intensity drive 15. Arc intensity drive 15 produces a command to welding torch 21 which causes an arc 22 to be established between electrode 23 and work piece 24 or 24a. Simultaneously with established arc 22, X-deflection drive 13 and Y-deflection drive 14 produce commands to X-magnetic poles 33 and Y-magnetic poles 34, respectively. In response thereto, X-magnetic poles 33 and Y-magnetic poles 34 introduce magnetic fields 35 and 36 which are communicated into the zone of arc 22 causing arc 22 to deflect from its normal path in response to the superpositioned intensities of fields 35 and 36. Field 35 is at an angle with respect to field 36 such that acting individually, the fields produce deflections at an angle and preferably substantially a right angle with each other and acting in concert produce deflections at any angle with respect to the weld seam. An X-deflection is defined as transverse to the weld gap and a Y-deflection is defined as parallel with the weld gap. Magnetic deflection of a welding arc is known in the prior art. Exemplary of magnetic deflection of a weld arc is U.S. Pat. No. 3,551,637 to Lampson, the disclosure of which is hereby incorporated by reference. In Lampson, magnetic pole pieces are located on either side of the weld seam and variable duty cycle waveform drive is used to cause the weld arc to travel back and forth across the weld seam. In the present invention, a plurality of magnetic poles are located at an angle with respect to each other so that the beam may be deflected in both an X and a Y direction, much in the same manner that the beam of cathode ray tube is deflected to produce diverse pictorial patterns. For example, as the weld arc generally progresses along the length of the weld seam, it can be caused to locally travel in circular, triangular, figure eight, elliptical, spiral, helical, random, or any other pattern capable of definition by a digital data set. Because of the rapidity with which electromagnetic poles 33 and 34 are capable of responding to commands, the system and method are is not limited to arc travel defined by X and Y positions only. The rate at which the arc is repositioned is also controllable.

Infrared sensor 41 generates data relating to the position and intensity of isotherm patterns. Infrared sensor 41 is preferably a two dimensional scanning array sensor capable of resolving an X-coordinate; a Y-coordinate and intensity data. One scan axis of sensor 41 is preferably aligned parallel with the weld seam and the other scan axis is preferably aligned transverse with the weld seam. The optical field of view of the scanning array must be large enough to encompass the desired isotherm pattern but not so large as to diminish the resolution of the sensor in the parallel and transverse directions. Suitable infrared sensors are well known in the art. One such sensor is disclosed in U.S. Pat. No. 4,555,614, the disclosure of which is hereby incorporated by reference. A method of controlling the position and intensity of an arc simultaneously is disclosed in U.S. Pat. No. 4,594,497, the disclosure of which is hereby incorporated by reference.

Data from the X-direction is routed to X-coordinate processor 45 and data from the Y-direction is routed to Y-coordinate processor 46. Processors 45 and 46 produce composite digital signals relating to the position and intensity of the isotherm patterns. X and Y coordinate processors are adapted to determine and digitize a multiplicity of data during each scan cycle. Although a large number of data points would seemingly be expected to provide the most accurate results, the number of data points considered must be small enough to allow for processing of the data before any significant travel of the weld arc along the weld seam has occurred. The number of data points which can be processed will of course depend on the processing speed of coordinate processors 45 and 46 and on the processing speed of controller processor 12. Data developed in processors 45 and 46 are forwarded to controller-processor 12.

When operating in a closed loop mode, controller 12 compares the portion of composite digital signals originating in processors 45 and 46 dedicated to the X and Y coordinates of a particular isotherm with desired isotherm coordinates which are stored in data storage device 11 and produces error signals for X and Y directions which modify data made available to deflection drives 13 and 14 for subsequent cycles. Modified data is also stored in data storage device 11 as a historical record of the weld conditions. In the closed loop mode, controller 12 also modifies the command signal to arc intensity drive 15 for the purpose of increasing or decreasing the intensity of arc 22. Upon command of the controller, data relating to X and Y deflections of arc 22 are replaced by modified data such that error signals relating to the difference between the locations of the desired isotherm patterns and the actual isotherm patterns approach zero. In this manner, a data set can be created for command of X and Y position and rate of change of position, which, in an open loop situation, will approximate the ideal and can be used in a simplified system which does not include the infrared sensor and the associated X and Y coordinate processors.

For aid in setting up the process, visual monitor 61 receives a composite video signal from controller 12 and displays a visual comparison of the desired isotherm pattern compared with the actual isotherm pattern.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A system for welding, comprising:
    means for electromagnetically deflecting a weld arc in a predetermined two dimensional geometrical path;
    means for sensing and identifying actual isotherms in a weld pool produced by said arc;
    means for sampling at least one isotherm and identifying a multiplicity of coordinate locations defining said at least one isotherm;
    means for computing orthogonal error signals corresponding to the location difference between each said coordinate location of said at least one isotherm and a predetermined corresponding coordinate location of a desired isotherm;
    means for superimposing magnetic energy on said weld arc in response to said error signals in a manner tending to minimize the difference between said actual isotherm coordinate locations and said desired isotherm coordinate locations.

2. A system for welding as claimed in claim 1, further comprising:
    means for modifying the intensity of the weld arc in response to differences between desired isotherm coordinates and actual isotherm coordinates.

3. A system for welding as claimed in claim 1 further comprising means for storing said orthogonal error signals to establish a time history of the differences between coordinate locations of said actual isotherm and said desired isotherm.

4. A method for welding, comprising:
    electromagnetically deflecting a weld arc arc in a predetermined two dimensional geometrical path;
    sensing and identifying actual isotherms in a weld pool produced by said arc;
    sampling at least one said actual isotherm and identifying a multiplicity of coordinate locations of said actual isotherm;
    computing orthogonal error signals corresponding to the location difference between each said coordinate location of said actual isotherm and a predetermined corresponding coordinate location of a desired isotherm; and,
    superimposing magnetic energy on the weld arc in response to said error signals in a manner tending to minimize the difference between said actual isotherm coordinate locations of said desired isotherm coordinate locations.

5. A method for welding as claimed in claim 4, further comprising:
    modifying the intensity of the weld arc in response to differences between desired isotherm coordinates and actual isotherm coordinates.

6. A method for welding as claimed in claim 4, further comprising storing a data set containing a time history of the differences between coordinate locations of said actual isotherm and said desired isotherm.

* * * * *